United States Patent [19]

Kring

[11] 4,076,899

[45] Feb. 28, 1978

[54] ELECTROCHEMICAL GAS ELECTRODE

[75] Inventor: Elbert Victor Kring, Hockessin, Del.

[73] Assignee: E. I. Du Pont de Nemours and Company, Wilmington, Del.

[21] Appl. No.: 356,911

[22] Filed: May 3, 1973

[51] Int. Cl.² .............................................. H01M 4/86
[52] U.S. Cl. ......................................... 429/42; 429/40
[58] Field of Search ...................... 136/120 FC, 86 D; 429/42, 40

[56] References Cited

U.S. PATENT DOCUMENTS

| | | | |
|---|---|---|---|
| 3,297,487 | 1/1967 | Pomeroy et al. | 136/120 FC |
| 3,346,421 | 10/1967 | Thompson et al. | 136/120 FC |
| 3,380,856 | 4/1968 | Pohl | 136/120 FC |
| 3,553,022 | 1/1971 | Gregory | 136/120 FC |
| 3,645,796 | 2/1972 | Bohm | 136/120 FC |
| 3,793,083 | 2/1974 | Paynter | 136/120 FC |

*Primary Examiner*—John H. Mack
*Assistant Examiner*—H. A. Feeley

[57] ABSTRACT

An improved electrochemical gas electrode and improved electrochemical fuel, gas detection and gas separation cells employing same as an anode therein, said improved electrode comprising a cohesive, gas-permeable conductive mass having a thin, gas-permeable hydrophobic film bonded to its gas-contacting surface, the conductive mass consisting essentially of 8-75 weight % of silicon and 25-92 weight % of one or more metals selected from vanadium, chromium, molybdenum, tungsten, manganese, iron, cobalt and nickel, said conductive mass optionally containing as a non-essential component up to 75 weight % of a conductive additive, based upon the combined weights of additive, silicon and metal, for example, carbon black or graphite.

4 Claims, No Drawings

ELECTROCHEMICAL GAS ELECTRODE

BACKGROUND OF THE INVENTION

1. Field of the Invention

The present invention relates to an improved electrochemical gas electrode for use in fuel cells wherein electrical energy is produced directly by the oxidation of a fuel, in gas detection cells wherein the electrical energy produced is correlated with the concentration of a fuel in a gas mixture and in gas separation cells wherein a component of a gas mixture is electrochemically oxidized and thereby removed from the gas stream.

2. Description of the Prior Art

Fuel, gas detection and gas separation cells generally comprise first and second conductive electrodes separated by an electrolyte, a supply of fuel gas contacting a gas-permeable surface area of the first electrode (the anode), an oxidant supply for cathodically depolarizing the second electrode (the cathode) and means for electrically connecting the electrodes. Electrodes are commonly composed of a precious metal catalyst, a catalyst support material and a hydrophobic coating and bonding material. The precious metal catalyst provides a gas absorption surface at which electrochemical oxidation occurs. The catalyst support material is porous and has a large surface area. The hydrophobic coating and bonding material binds the catalyst to the catalyst support and also controls the flooding of the electrolyte to the gas side of the electrode surface. Such electrodes are expensive and difficult to prepare with the proper balance of porosity, activity and wettability.

U.S. Pat. No. 3,297,487 discloses fuel cells using catalyst-coated electrodes consisting of silicon and vanadium, chromium, molybdenum, tungsten, manganese, iron, cobalt or nickel. The cathode need not be catalyst-coated if the cell is operated above about 65° C. U.S. Pat. No. 3,432,355 discloses fuel cell electrodes having thin film hydrophobic coatings and having a catalyst bonded thereto by means of a polytetrafluoroethylene binder. U.S. Pat. No. 3,622,487 discloses a detector cell which is capable of monitoring oxides of nitrogen in gas streams and which has a precious metal anode and a metal oxide cathode. The gas being analyzed dissolves in a thin film of electrolyte over the anode surfaces but it must be kept from diffusing through the electrolyte to the cathode.

OBJECT AND SUMMARY OF THE INVENTION

It is an object of this invention to provide an electrochemical electrode which is free of a precious metal catalyst. Another object is to provide an economical electrode that is simpler to prepare because it requires fewer essential components. An additional object is to provide such an electrode, and a gas detection cell containing same, for determination of nitric oxide concentration in a complex gas mixture, such as automobile exhaust gas. A still further object is to provide a gas separation cell for oxidatively removing an oxidizable gas, such as nitric oxide, from stack gas.

In summary, this invention is directed to an improved electrochemical gas electrode and to the use thereof as the anode in fuel cells, gas detection cells and gas separation cells comprising first and second conductive electrodes (anode and cathode, respectively) separated by an electrolyte, a supply of fuel gas contacting a gas-permeable surface area of the first electrode, a cathode depolarizer for the second electrode and means for electrically connecting the electrodes. The improved electrode comprises a cohesive, gas-permeable conductive mass having a thin, gas-permeable hydrophobic film bonded to its gas-contacting surface, the conductive mass consisting essentially of 8-75 weight % of silicon and 25-92 weight % of one or more metals selected from vanadium, chromium, molybdenum, tungsten, manganese, iron, cobalt and nickel.

Specific embodiments of the invention include such electrodes wherein the cohesive silicon-metal mass is a sintered powder or powder particles of the aforesaid silicon and metal components bonded together by an adhesive binder. This invention is also directed to a gas detection cell which is selective for nitric oxide in automobile exhaust gas, which employs the improved electrode as a gas anode and wherein the cathode depolarizer, that is, a material which supplies oxidant to the second electrode (the cathode), is an electrolyte-solvated (soluble) reducible material which is chosen to provide a voltage difference between the two electrodes during cell operation that is sufficient to produce a measurable current response. The invention is further directed to a gas detection or separation cell which is specific for an oxidizable gas, such as nitric oxide, wherein cathode depolarization is obtained with an external electrical source connected to the first and second electrodes and wherein there is established a voltage bias between the two electrodes in a range sufficient to oxidize an oxidizable gas, such as nitric oxide.

DETAILED DESCRIPTION OF THE INVENTION

As indicated above, the improved electrode of this invention consists essentially of 8-75 weight % of silicon and 25-92 weight % of one or more of the aforesaid metals. If the quantity of silicon falls below this range, the corrosion resistance of the electrode suffers; if it goes above this range, sintered metal electrodes become too friable. Typical silicon-metal compositions which are useful herein include ferrosilicon alloys, cobalt-silicon alloys, molybdenum-silicon alloys and silicides, such as molybdenum disilicide. These compositions can be preformed or prepared in situ by heating together suitable proportions of silicon powder and powder of one of the aforesaid metals. As the terms are used herein, a silicide is a compound of silicon and an alloy is a substance having metallic properties and composed of two or more chemical elements, of which at least one is an elemental metal.

Ferrosilicon alloys having nominal silicon contents of 15, 25, 50 and 75 weight % are readily available commercially. The actual silicon contents of such commercially available materials usually fall within a range near the nominal value. For example, a 15% ferrosilicon alloy may contain 14–18 weight % silicon. Other elements such as carbon, phosphorus and sulfur may ordinarily be present in small amounts but, as such, do not interfere in the preparation of the improved electrode of this invention and do not affect the performance of the electrode in the improved cells of this invention.

Cohesive, gas-permeable, conductive structures can be formed from the silicon-metal compositions in many ways, for example, by sintering a high surface area powdered composition in a container of the shape desired for the electrode. The sintering temperature is determined from a consideration of the silicon-metal composition and, to a lesser extent, the particle size and impurities that are present. For example, with a ferrosilicon alloy, the sintering temperature can range from about 1,000°–1,175° C.; with cobalt-silicon alloys, from 1,150°–1,250° C.; and with molybdenum-silicon alloys, from 1,100°–1,650° C. In general, the sintering temperature will be 1,000°–1,700° C. A narrow particle size range for the powder generally improves the gas permeability of the sintered mass. The average particle size of the powder preferably should be about 15–115 microns. If the particles are too fine, the resulting mass is cohesive and conductive but it may lack sufficient surface area to provide the desired electrochemical activity or it may lack sufficient interstices to provide the desired gas permeability; if they are too coarse, the electrical conductivity obtained may be less than that desired.

A current collector is usually embedded in the powder before sintering so that it is bonded in the electrode structure during sintering. It can also be pressed or bonded to the electrolyte side of the cohesive mass after sintering. Suitable materials which are useful in providing good electrically conducting, corrosion resistant current collectors include gold, a gold plated metal, tantalum and titanium containing a small amount of palladium; suitable forms of such materials include screens, wires, bars, punched or expanded plates and porous sheets. An embedded current collector is usually connected, for example, by tack welding, to an appropriate electrical lead for connection to an external electrical circuit.

Cohesive, gas-permeable conductive electrode structures can also be formed by converting silicon-metal powders having a narrow particle size range and small average particle size into a cohesive mass of desired shape with a chemically inert adhesive binder. Such binders are known and in common use in the electrode art for bonding catalysts to metal particles, for bonding metal particles to each other and for bonding metal particles to a current collector. Suitable binders for use herein need only be so adhesive as to bond the silicon-metal powder particles to each other and to the aforesaid current collector in an electrically conductive relationship. Exemplary of desirable electrical conductivities, the electrode resistance of a 3 × 3 inch ferrosilicon electrode having a thickness of about 5–15 mils is usually less than one ohm, and typically less than 300 milliohms. The binders should also be chemically inert to cell fluids, such as the cell electrolyte and reactants or products that may be present at the electrodes. Materials which are suitable as binders include polymeric materials, such as a chlorinated butyl rubber, polystyrene, polymethyl methacrylate, polyethylene terephthalate, polyvinyl chloride, polyvinyl fluoride, fluorocarbon elastomer, polyurethane, polybutadiene, polyisoprene, chlorosulfonated polyethylene, chlorinated polyethylene and polytetrafluoroethylene (PTFE). The latter is preferred as a binder because of its inertness, even at high temperatures.

Conductive additives such as carbon black or graphite powder (140–325 mesh; U.S. Sieve Series) can be introduced into the cohesive mass-forming composition to provide lower electrode resistance and a lower overall internal resistance of any electrochemical cell which contains the electrode. The amount of conductive additive introduced should not be such as to significantly reduce, by replacement, the effective surface area or surface activity of the silicon-metal electrode or change its selectivity, in the electrochemical cell, toward a fuel component that is to be detected in or separated from a gas stream. For this reason, the amount of conductive additive usually does not exceed about 75% of the combined weights of the silicon-metal composition and the conductive additive. It is to be understood that the conductive additive is not an essential part of this invention and, therefore, its weight is not considered in the determination of the aforesaid percentages of silicon and metal in the cohesive mass, that is, 8–75 weight % of silicon and 25–92 weight % of metal. It has been discovered that an especially consistently active electrode can be prepared from a ferrosilicon alloy/graphite powder mixture which contains, by weight, 0.01–0.5 part of concentrated sulfuric acid per part of ferrosilicon alloy/graphite powder mixture.

A volatile solvent which is removable by evaporation at temperatures up to about 150° C. is usually used to dissolve the aforesaid binder and combine it with the silicon-metal powdered composition and any filler employed, for example, a conductive additive. Suitable solvents include dioxane, methanol, formic acid, ethanol, ethyl acetate, butyl acetate, dioxolane, ether, acetone, methyl ethyl ketone, cyclohexanone, acetic acid and water. Preferably, an aqueous emulsion of PTFE containing about 15–60 weight % solids is combined with the silicon-metal powder. Commercially available PTFE formulations, such as "Teflon"-30 fluorocarbon aqueous dispersion, usually contain wetting agents which facilitate the thorough wetting of the powder particles. In formulating a suitable silicon-metal powder/binder/solvent mixture the amount of chemically inert adhesive binder present should be 0.02–0.2 part, preferably 0.05–0.15 part, per part of silicon-metal powder. Lesser amounts do not sufficiently bind the powder particles together to form a cohesive mass. Greater amounts tend to fill the spaces between the powder particles and render the cohesive mass impermeable to gas.

Following is a typical procedure for forming a cohesive mass which is suitable as the electrode of this invention. A ferrosilicon alloy powder containing 17% or 41% silicon or a powdered molybdenum disilicide is shaken with an appropriate amount of conductive graphite, preferably an amorphous Mexican graphite. A PTFE aqueous dispersion and sufficient water are added to produce a smooth paste containing 0.02–0.2 part of binder per part of silicon-metal powder. The paste is spread evenly on a flat current collector and rolled to the desired thickness, then air-dried and, finally, heated to produce a cohesive, gas-permeable, conductive mass. In carrying out the heating step, preferably, the temperature is raised very slowly, for example, no more than about 5° C. per minute, during the initial stages in order to avoid cracking and to obtain satisfactory cohesive, gas-permeable, conductive properties. Ultimately, the temperature is raised to about 250°–300° C., to remove, as white fumes, the wetting agent ordinarily present in the PTFE dispersion, and then to a temperature high enough, for example 325°–450° C., preferably 350°–400° C., to cause the sintering of the individual particles of the PTFE, thus binding together into a cohesive, gas-permeable, conductive mass all the various particles and the current collector.

The formation of the thin, gas-permeable, hydrophobic film on the gas contacting surface of the cohesive mass, to complete the formation of the electrode of this invention, can be carried out employing a variety of techniques. For example, the film can be produced directly on the surface of the cohesive mass, the film can be preformed and then bonded to the cohesive mass or the cohesive mass can be cast on a preformed film.

As an illustration, a film is formed by applying a hydrophobic, film-forming polymeric coating on the gas-contacting surface of the gas-permeable conductive mass which has been either cohesively sintered or cohesively bonded with a binder. Although many film-forming polymeric materials can be used, PTFE is particularly preferred because of its known ability to prevent an electrolyte from flooding an electrode; it can be applied by spraying or otherwise spreading a dispersion of it in a carrier solvent. A typical procedure is to airbrush the surface with a commercial PTFE aqueous dispersion, for example, "Teflon"-30 aqueous dispersion which has been diluted 10:1 with water. Films ranging from about 5–50 mg. of PTFE per square inch of surface can be formed by laying down one or more, for example, 1–10, coatings over the gas contacting area of the electrode. The rate of application of dispersion is controlled so that wet areas do not develop and run. Although each coating can be applied to a relatively cold surface and then heated to transform it into a film, it is simpler to preheat the surface to be coated to about 150° C. so that the water is rapidly volatilized and removed from each coating as it is applied. When the desired coating thickness is reached after several sprayings, the surface is heated to about 250°–300° C. to remove the dispersion wetting agent, as white fumes, from the coating. Heating is continued and adhesive bonding and the desired gas-permeable, hydrophobic film properties are developed on reaching sintering conditions for PTFE. Usually, 1–5 minutes at about 325° C. is sufficient for the purpose. Suitable heating schedules are readily determined for particular electrode structures and film thicknesses.

Preformed, hydrophobic, gas-permeable polymeric films can be prepared from polymer solutions or dispersions using conventional known techniques and then bonded to the cohesive mass using known bonding agents and techniques. Suitable preformed films are made of glass, asbestos, polyacrylonitrile, polyvinylidene chloride or other relatively inert material. PTFE, especially PTFE fiber cloth, is preferred because of its inertness and thermal stability. Such preformed films can be almost microscopically porous and they may even appear to be continuous. They can be formed by spraying on a support surface from which they can later be stripped. It has been discovered that such a preformed film, especially a PTFE film, can be bonded to the cohesive mass which is formed from a silicon-metal powder/binder/solvent mixture by application of a small amount of pressure, for example, as is obtained by hand rubbing.

Still another way of forming a thin, gas-permeable, hydrophobic film on the cohesive mass is to use a permeable woven or nonwoven fiber cloth or other open structure as a casting surface for the cohesive mass-forming mixture of silicon-metal powder, binder and solvent. The casting surface is retained on the cohesive mass as the gas-permeable membrane.

These means and other equivalent means for constructing the improved first electrode (anode) of this invention will be readily apparent to those skilled in the art. In a preferred electrode the binder and the thin, gas-permeable hydrophobic film both consist essentially of hydrophobic PTFE which is resistant to the highly acidic and basic electrolytes which may be encountered in fuel cells, gas detection cells and gas separation cells.

As indicated above, this invention also relates to the use of the aforesaid electrode in combination with known elements to form a fuel cell, gas detection cell or gas separation cell composed of first and second conductive electrodes separated by an electrolyte, a supply of fuel gas contacting a gas-permeable surface of the improved electrode of this invention, a cathode depolarizer for the second electrode and means for electrically connecting the electrodes. Furthermore, this invention includes the use of certain cathode depolarizers to achieve selective detection of nitric oxide in automobile exhaust gas and efficient removal of nitric oxide from stack gas. The nature of the cathode and the means by which it is depolarized are not critical to the aforesaid cell so long as the cathode provides in combination with the first electrode (anode), during cell operation, the desired voltage difference, that is, to produce an externally measurable current.

In a broad sense, a cathode depolarizer, which is chosen to provide a voltage difference between the two electrodes during cell operation that is sufficient to provide a measurable current response when a selected fuel gas is being oxidized at the first electrode, comprises a material which supplies oxidant to the second electrode (cathode) that is, a material which is capable of receiving the electrons generated during an electrochemical oxidation at the first electrode (anode). Such an oxidant-supplying material can be a solid cathode depolarizer, for example, a reducible, solid polyvalent metal oxide that is insoluble in the electrolyte used in the cell. Typically, a solid metal oxide can be selected from electrochemical tables to provide as large a potential difference relative to the anode as possible and, therefore, as large a current response as possible. Generally, a measurable current response is in the range of 0.01–10 milliamperes per square inch of electrode area when a selected fuel gas containing nitric oxide is being oxidized. Suitable solid polyvalent metal oxides include manganese dioxide, lead dioxide and other metal oxides having a rest potential relative to a standard hydrogen electrode greater than about 1.0 volt.

Alternatively, the oxidant-supplying material can be an electrolyte-soluble reducible material which is added to the electrolyte. Such a material is chosen to provide a voltage difference between the two electrodes during cell operation that is sufficient to produce a measurable current response. It may, but need not necessarily, form ions in the electrolyte. Materials that do form ions include permanganate and dichromate salts of the Group IA and Group IIA elements of the Periodic Chart of the Elements, for example, Li, Na, K, Ca and Mg, and ceric salts, such as cerium sulfate, which are readily soluble in acid electrolytes. Usually, the soluble material is chosen to provide as large a voltage difference as possible. In connection therewith, as is well known, ceric ion in sulfuric acid electrolyte provides a larger voltage difference than dichromate ion which provides a larger voltage difference than permanganate ion. However, better selectivity for the oxidation of one particular gas in a complex mixture of gases may sometimes be obtained using a soluble material that does not provide the largest voltage difference. To illustrate, a preferred gas detection cell which is remarkably selective for nitric oxide in a complex gas mixture such as automobile exhaust gas can be prepared using potassium permanganate as the electrolyte-soluble material. Cells having a lower selectivity for nitric oxide and made with a dichromate salt or a ceric salt may still be useful, however, when analyzing other gas mixtures.

The electrolyte which is used in the cells of this invention can vary broadly provided it is inert to the electrodes and the rest of the cell constituents and does not interfere with the fuel for the reaction which is to be effected. Acidic aqueous electrolytes are usually employed and preferred. One such acidic electrolyte which is used in the preferred nitric oxide detector cell and, broadly, in all cells of the invention is 1–40 weight % aqueous sulfuric acid because it has high electrolytic conductivity, usually, at least 10,000 micromhos per cm. When permanganate is employed as the oxidant-supplying material, high concentrations are avoided to prevent chemical interaction with cell components. Other concentrations of aqueous sulfuric acid are useful, however, as are aqueous solutions of other acids, such as phosphoric acid, and aqueous solutions of ammonium sulfate or ammonium bisfulate.

It has been discovered in connection with this invention that dilute acid permanganate solutions containing about 0.01–0.1 normal sulfuric acid are more chemically stable and their conductivities can be increased, if desired, by the addition of sodium sulfate, thereby approaching the greater cell response attainable with more concentrated acidic electrolytes. Alternatively to the use of a dilute acid solution-sodium sulfate mixture for increasing cell response, a dry "Fiberglas" filter mat saturated with permanganate, dichromate or ceric salt crystals can be wet with dilute or concentrated, preferably concentrated, sulfuric or phosphoric acid just prior to cell use.

A representative selective gas detection cell for nitric oxide in auto exhaust comprises the improved electrode of this invention as a first electrode, a second electrode formed of an electrochemically inert material such as graphite pressed into a tantalum current collector screen and a "Fiberglas" filter mat having about the same area as the electrodes, usually 1–3 inches square, and placed between the first and second electrodes as a separator and wet with a 2.0 molar aqueous solution of potassium permanganate adjusted to a pH of about 2.0 with sulfuric acid. Standard gaseous mixtures containing concentrations of nitric oxide up to the maximum amount usually present in auto exhaust, about 5,000 ppm., can be used to correlate the electric current output of such a cell at flow rates of about 100 cc. per minute to the first electrode.

The efficiency of a small nitric oxide gas detection cell is generally greater than 20%. Therefore, it can readily be used as a gas separation cell, especially by increasing its surface area from a few square inches to a few square feet, to achieve almost complete oxidative removal of nitric oxide from gas mixtures. For other oxidizable gases, for example, sulfur dioxide, a different cathode depolarization means can be employed; for example, an improved gas detector cell which is sensitive to sulfur dioxide gas can be made with an air (oxygen) cathode consisting of a gas electrode in contact with a supply of oxygen-containing gas such as air. For nitric oxide, sulfur dioxide or other oxidizable gas, such as hydrogen or a volatile hydrocarbon, especially of the acetylenic type, an external electrical bias from a power source can be used to establish the potential difference between electrodes that favors the electrochemical oxidation of the particular gas at the anode. In other words, the cathode depolarizer is chosen according to the gas component to be oxidized at the anode and the degree of selectivity desired.

Since the silicon-metal cohesive mass of the electrode of this invention is relatively inexpensive to produce, a major saving can be effected when it is used in place of the precious metal catalyst and catalyst support surface employed in many prior art electrodes. The electrode of this invention presents a highly efficient surface (as an anode) and it can be used in a gas detection cell for the dertermination of nitric oxide in complex gas mixtures, such as automobile exhaust gas, in fuel cells and in gas separation cells to remove, for example, nitric oxide from stack gas. Furthermore, the improved cells of this invention generally contain fewer components then cells containing precious metal electrodes and they do not require elevated temperatures for operation. They are operable at about 0°–100° C., especially at ambient temperatures of 15°–30° C.

The invention will be more clearly understood by referring to the examples which follow. Parts and percentages are by weight unless otherwise stated.

EXAMPLE 1

An improved gas electrode is constructed in the following manner. A piece of 3-mil thick, 3/0 expanded metal screen made of a Ti/3%Pd alloy is cut 1 inch wide and 1.25 inch in height to serve as a current collector. Ferrosilicon alloy powder (17% Si) which passes through a 140 mesh (U.S. Sieve Series) screen but not through a 270 mesh screen is loosely packed in a graphite mold to cover a 1 × 1 inch area of the current collector screen embedded in it. The powder is then sintered at 1,050° C. for 2 hours in a resistance-heated vacuum furnace to form a cohesive, gas-permeable, conductive mass. "Teflon"-30 aqueous fluorocarbon dispersion (a commercially available PTFE dispersion) containing 30% solids is diluted 10:1 with deionized water and the diluted dispersion is air-brushed onto the surface of one side of the cohesive mass while the mass is heated to 150° C. Successive thin coatings form cumulative PTFE deposits of 5.9, 10.3, 15.5 and 25.2 mg. per square inch. The final thickened coating, about 10 mils thick, is then heated to 320° C. and held at this temperature briefly to form a thin, gas-permeable hydrophobic film upon which a water drop will bead. An electrical lead is tack-welded to the exposed metal screen at the top of the electrode for connection to an external circuit. The electrode so produced is suitable for general use in fuel cells wherein fuel gas is supplied to its coated surface.

EXAMPLE 2

An improved gas electrode is made by sintering a 55 Fe/45 Si ferrosilicon alloy powder in a carbon mold at 1,100° C. for 45 minutes in a vacuum furnace and embedding a current collector as in Example 1. The particle size distribution of the powder is 44.7% held on a 270 mesh screen, 12.1% held on a 325 mesh screen, 5.8% held on a 400 mesh screen and 37.4% through a 400 mesh screen. A thin, gas-permeable hydrophobic film is applied to one side of the coherent sintered mass as in Example 1. The electrode is corrosion resistant when contacted with sulfuric acid electrolyte and it electrochemically oxidizes nitric oxide fuel when used in a fuel cell containing a solid manganese dioxide/graphite cathode in contact with 4N $H_2SO_4$ electrolyte.

EXAMPLE 3

A gas electrode is prepared and used as in Example 2 except that molybdenumm disilicide passing a 325 mesh screen is used instead of the ferrosilicon alloy and it is sintered in a helium atmosphere for 3 hours at 1,075° C. The results are substantially the same.

EXAMPLE 4

Results similar to those obtained in Example 1 are achieved when an electrode made from a 50:50 mixture of the ferrosilicon alloy of Example 1 and molybdenum disilicide is used instead of the ferrosilicon electrode.

EXAMPLE 5

A mixture of natural Mexican graphite (140/325 mesh) and ferrosilicon alloy powder containing 45% silicon (140/325 mesh), the amount of ferrosilicon alloy powder in the mixture being 75% by weight, was mixed thoroughly on a shaker for 15 minutes. 4 Grams of the mixture were then wet with 1.33 cc. of "Teflon"-30 aqueous fluorocarbon dispersion having 30% solids and sufficient water to make a spreadable paste. The wet mixture was applied to a 4/0 expanded metal tantalum screen current collector 3 × 3 inches and about 3 mils thick and then air-dried for 45 minutes to prevent cracking. The mixture dried around the embedded screen to a thickness of about 5 mils; it was then placed on top of a thermally insulative "Transite" board about 0.25 inch thick; the board was placed on an unheated hot plate. The hot plate was turned on and heated to 350° C.; after 45 minutes the dried mixture on the board reached a temperature of 250° C. and nonionic wetting agents (from the fluorocarbon dispersion) were driven off as white fumes. The mixture was then taken from the board and placed directly on the hot plate, still held at 350° C., for 5 minutes to form a cohesive mass about 15 mils thick. A thin, gas-permeable, hydrophobic PTFE film was then applied to one surface by spraying as in Example 1.

A gas detection cell was assembled so as to contain the above electrode as an anode, a "Fiberglas" filter mat as a separator between electrodes, an aqueous electrolyte solution containing sufficient sulfuric acid to adjust the pH to about 2.0, potassium permanganate in 2.5 molar strength as the oxidant for cathodically depolarizing an inert electrode and, as the inert cathode, conductive graphite which was pressed into a tantalum screen (as described for the anode). Cell resistance, including the resistance of the anode, was 210 milliohms.

Standard mixtures of nitric oxide in nitrogen carrier gas were prepared, so as to have the concentrations (in ppm.) shown in the following table, and brought into contact with the anode of the above gas detection cell at a flow rate of 100 cc. per minute. the electric currents shown in the table (in milliamperes) were observed using a Weston 911 milliammeter as a current indicating means in an external circuit connected to the anode and cathode leads. When the nitric oxide-nitrogen gas mixtures were replaced with air nitrogen, hydrocarbon gas (such as propane)-nitrogen and/or carbon monoxide-nitrogen mixtures containing up to 8% of air, hydrocarbon or carbon monoxide, respectively, that is, concentrations usually encountered in automobile exhaust gas, the currents produced were substantially zero. Air undiluted with nitrogen also produced a zero response

| NO (ppm.) | Current (mA) |
| --- | --- |
| 55 | 0.17 |
| 102 | 0.60 |
| 318 | 2.0 |
| 530 | 3.2 |
| 1085 | 7.5 |
| 1598 | 9.7 |

The efficiency of the cell was such as to provide a 24% reduction of nitric oxide as determined on one pass of the 530 ppm. standard mixture. The assembled and calibrated detector cell is useful in measuring nitric oxide at concentrations of 50 to 3,000 ppm. in bagged automobile exhaust gas at ambient temperature; if desired, it can be calibrated at a suitable elevated temperature and used to measure nitric oxide in warm exhaust gas, for example, at about 50° C., as it comes from the tailpipe of an automobile; or it can be scaled up and rebuilt as a gas separation cell having an effective electrode area of about 1 square foot, thus being useful for removing nitric oxide from stack gas.

EXAMPLE 6

The ferrosilicon alloy powder/graphite mixture of Example 5 after being wet with PTFE dispersion was wet further with 0.07 part (about 3 drops) of concentrated sulfuric acid and sufficient water to make a spreadable paste. Anodes prepared from such pastes and assembled into gas separation cells as in Example 5 showed consistently high activities, that is, efficiencies, in reducing the nitric oxide contents of standard gas mixtures prepared as in Example 5.

I claim:

1. Improved electrochemical nitric oxide gas detection or gas separation cell comprising an anode, a cathode which is separated from the anode by an electrolyte, a cathode depolarizer and means for electrically connecting the anode and cathode, said anode being an improved electrochemical gas electrode consisting essentially of a cohesive, gas-permeable conductive mass having a thin, gas-permeable hydrophobic film bonded to its gas-contacting surface, the conductive mass consisting essentially of 8–75 weight % of silicon and 25–92 weight % of one or more metals selected from vanadium, chromium, molybdenum, tungsten, manganese, iron, cobalt and nickel, said depolarizer selected so as to provide a voltage difference between the anode and the cathode during cell operation that is sufficient to produce a measurable current response when nitric oxide gas is oxidized at the anode, said depolarizer being an electrolyte-soluble reducible permanganate or dichromate salt of an element of Group IA or Group IIA of the Periodic Chart of the Elements or a ceric salt, in contact with the cathode, and said electrolyte being an acid electrolyte.

2. The cell of claim 1 wherein the acid electrolyte is a dilute acid permanganate solution containing $0.01$–$0.1N H_2SO_4$.

3. The cell of claim 2 wherein the acid electrolyte contains sodium sulfate.

4. The cell of claim 1 wherein the cathode depolarizer is provided by means of a permanganate, dichromate or ceric salt-saturated "Fiberglas" filter wet with concentrated sulfuric acid.

* * * * *